United States Patent
Lin

(10) Patent No.: US 12,242,118 B2
(45) Date of Patent: Mar. 4, 2025

(54) DELATCH MECHANISM AND OPTICAL CONNECTOR USING THE SAME

(71) Applicant: Sung-Chi Lin, Myau-Li County (TW)

(72) Inventor: Sung-Chi Lin, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 199 days.

(21) Appl. No.: 17/170,894

(22) Filed: Feb. 9, 2021

(65) Prior Publication Data

US 2021/0263242 A1 Aug. 26, 2021

(30) Foreign Application Priority Data

Feb. 20, 2020 (TW) .................................. 109105537

(51) Int. Cl.
*G02B 6/38* (2006.01)
(52) U.S. Cl.
CPC .................................. *G02B 6/3898* (2013.01)
(58) Field of Classification Search
CPC .................................................... G02B 6/3828
See application file for complete search history.

(56) References Cited

U.S. PATENT DOCUMENTS

| 10,067,301 | B2* | 9/2018 | Murray | G02B 6/3831 |
| 2007/0059953 | A1* | 3/2007 | Togami | G02B 6/4261 439/76.1 |
| 2016/0047993 | A1* | 2/2016 | Hioki | G02B 6/3893 385/139 |
| 2017/0293088 | A1* | 10/2017 | Manes | G02B 6/3825 |

* cited by examiner

*Primary Examiner* — Sung H Pak
*Assistant Examiner* — Hoang Q Tran

(57) ABSTRACT

The present invention provides a delatch mechanism for releasing a latching status between a positioning structure of an optical connector and a positioning hole of a receptacle. The delatch mechanism comprises a supporting base, and a delatching unit. The supporting base is arranged on the optical connector. The delatching unit comprises a rotating base, a pressing structure and a release lever, wherein the rotating base is rotatably coupled to the supporting base, the pressing structure is arranged on the rotating base and lean against the optical connector, and the release level is coupled to the supporting base. Alternatively, the present invention further provides an optical connector having the delatch mechanism arranged thereon so that the latching status between the optical connector and receptacle may be released to pull out the optical connector from the receptacle by operating the delatch mechanism.

19 Claims, 8 Drawing Sheets

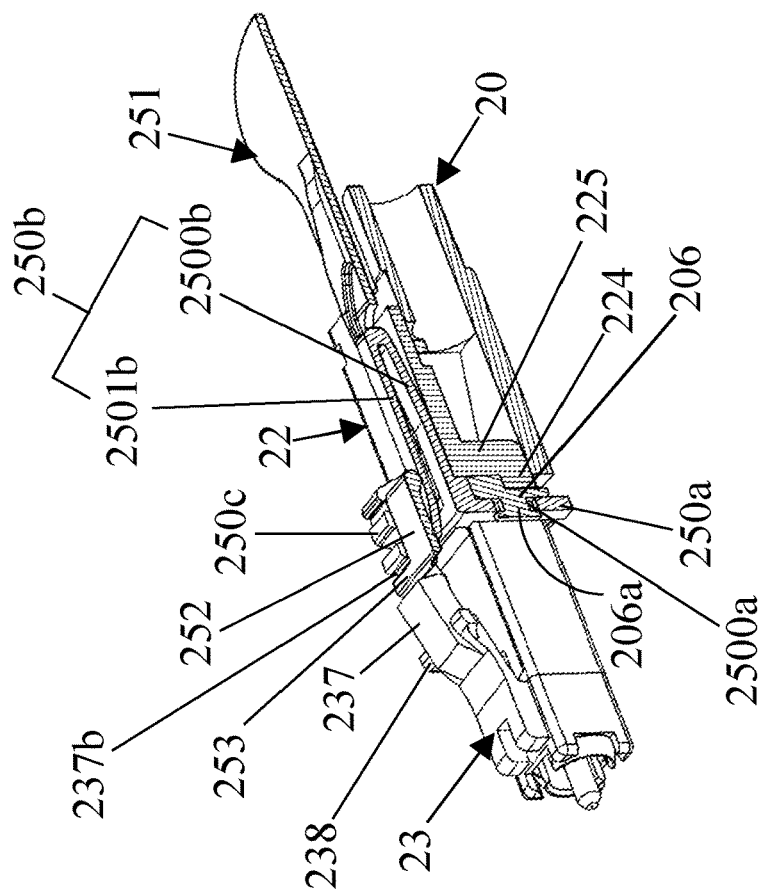
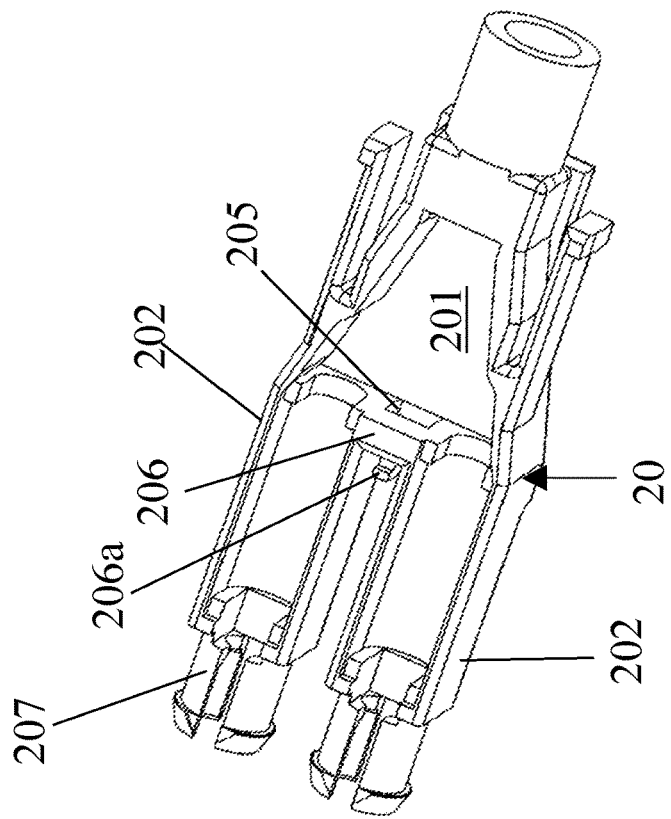
FIG 3A
FIG 3B

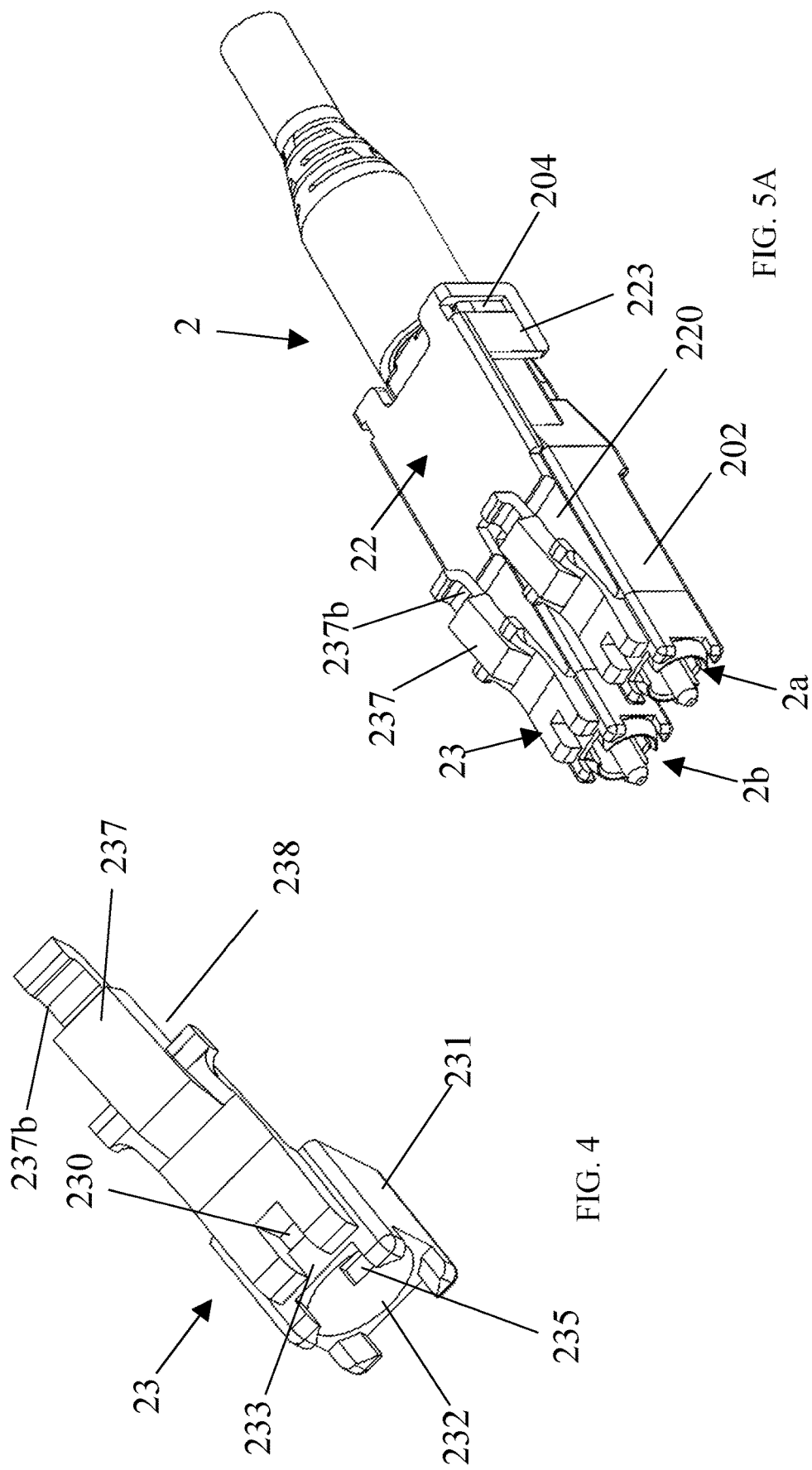

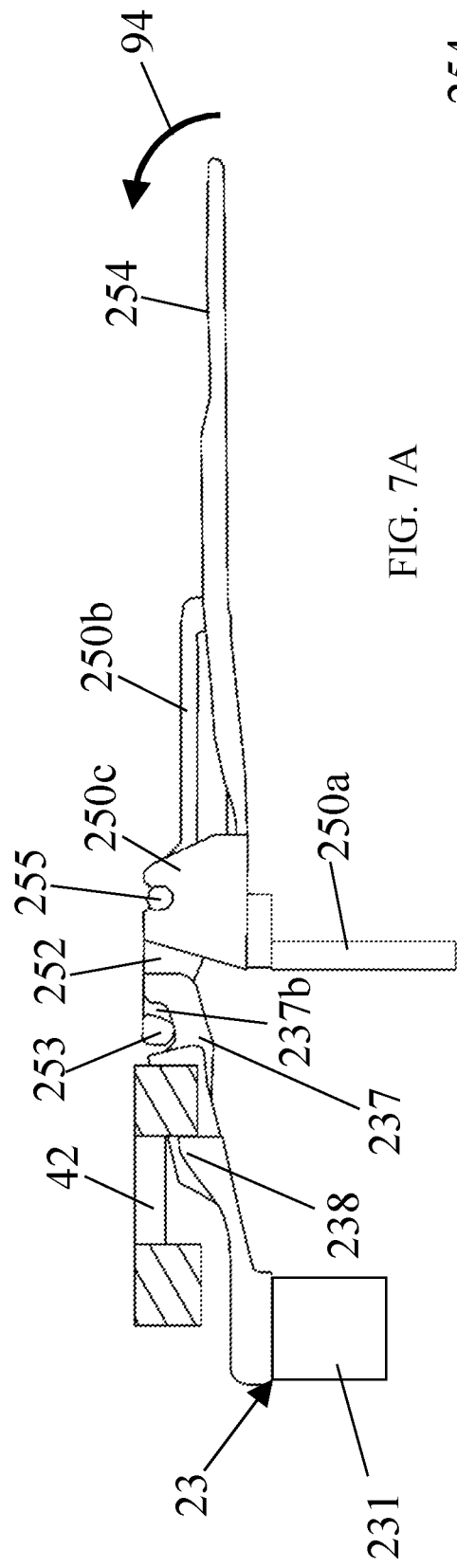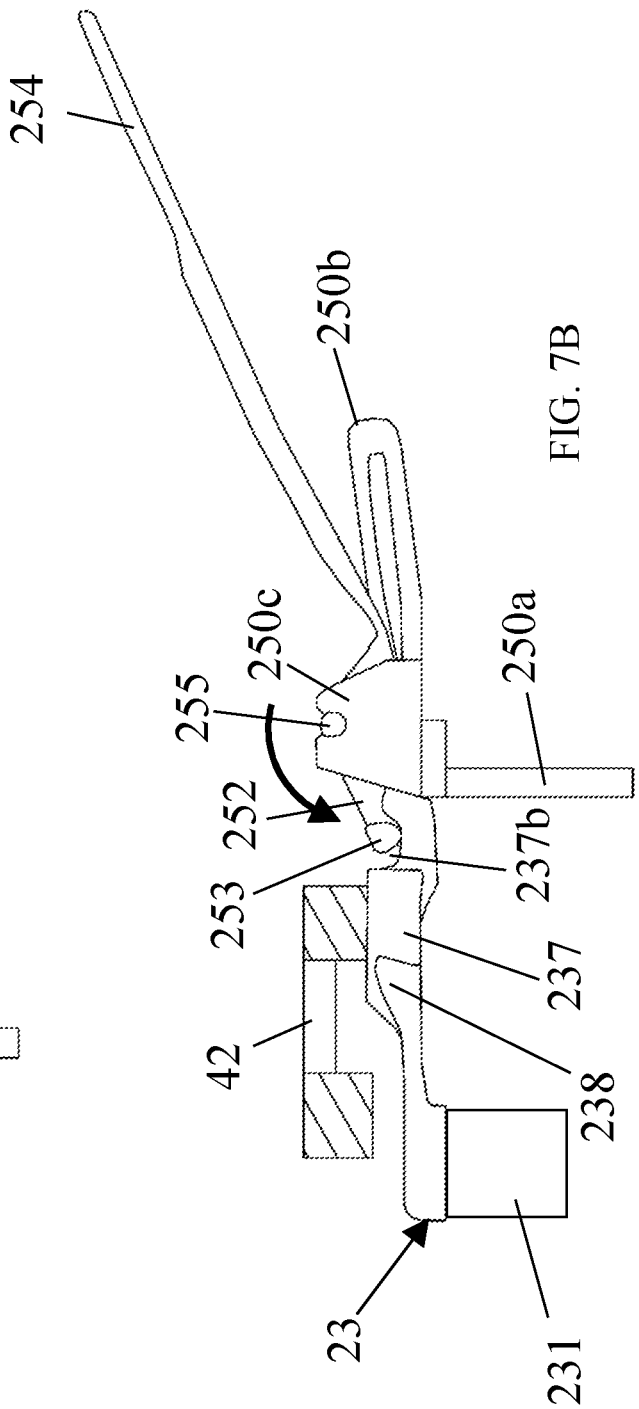

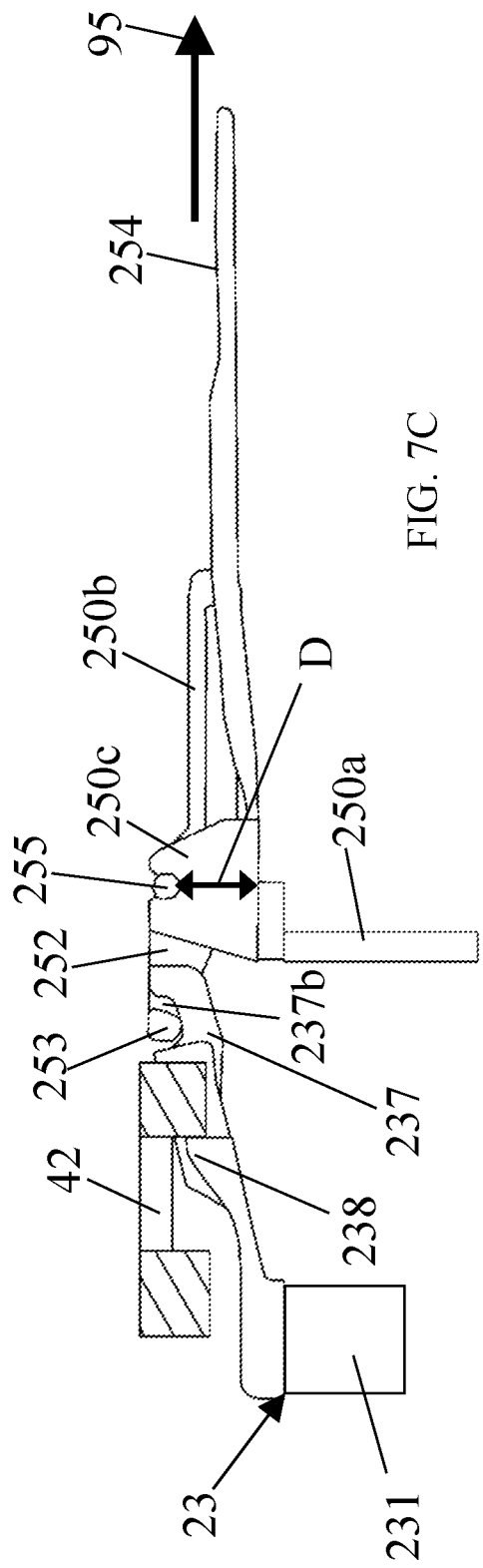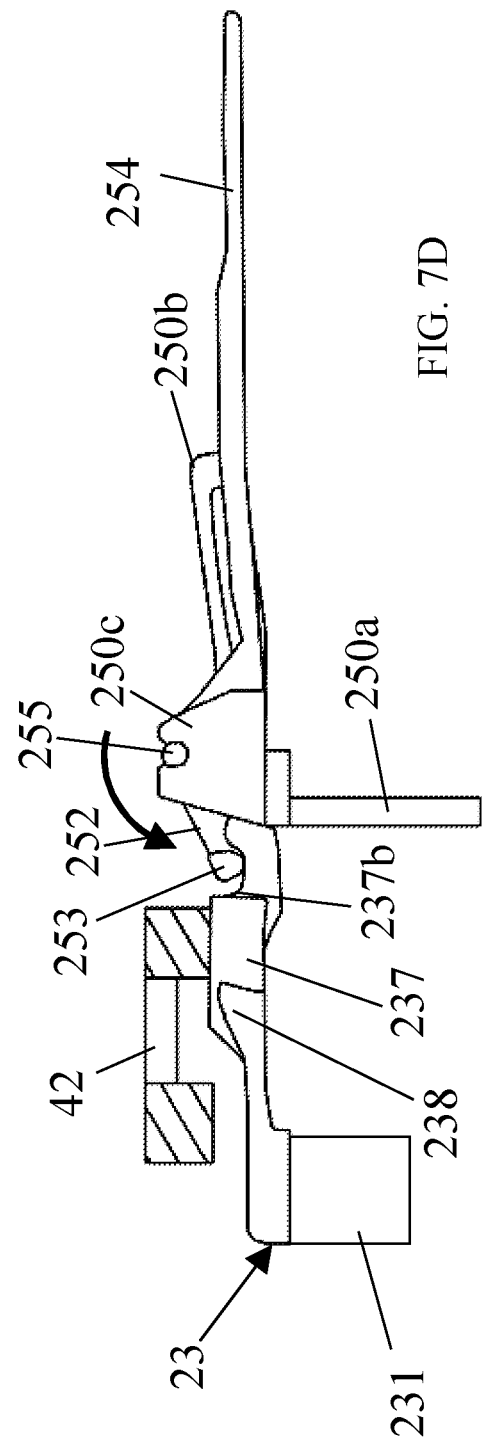

DELATCH MECHANISM AND OPTICAL CONNECTOR USING THE SAME

CROSS-REFERENCE TO RELATED APPLICATION

This application claims the benefit of Taiwan Patent Application No. 109105537, filed on Feb. 20, 2020, in the Taiwan Intellectual Property Office of the R.O.C, the disclosure of which is incorporated herein in its entirety by reference.

FIELD OF INVENTION

The present invention relates to a delatch mechanism. In particular, it relates to a delatch mechanism, which releases the latching status between an optical connector and a receptacle, and the optical connector using the same.

BACKGROUND OF THE INVENTION

Optical fibers have been widely used as signal transmission media in recent years due to the advantages of high frequency bandwidth and low loss. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Among the optical fiber module, in addition to the structure of the receptacle, the design of the optical connector is also very important. There are many types of optical connectors, and different manufacturers have different designs, such as SN connectors, MDC connectors, or LC connectors. Since these connectors are miniaturized in size and densely arranged, when there is a need to repair or replace the connectors, it is difficult for the maintenance personnel to directly use the finger operation to pull the specific connector out of the receptacle or insert it into the receptacle. Therefore, maintenance personnel often have to unplug the connectors for maintenance. Nevertheless, most equipment in the computer room or equipment room is unable to stop. If the optical connectors are unplugged, it would also affect the normal operation of the communication equipment. Therefore, how to solve this problem is an important issue.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a delatch mechanism and an optical connector using the same, through the delatch mechanism with flexible restoring force, the latching status between an optical connector and a receptacle is released. In addition, the delatch mechanism also generates the elastic restoring force to return the buckle structure of the optical connector to its original position to ensure that the buckle structure of the optical connector may return to the initial position.

The present invention provides an optical connector, which has a rotating structure for changing the polarity, so that the optical connector may change the polarity to adapt to the different connectors. In addition, the cover of the optical connector has a double locking mechanism, which ensures that the cover may effectively generate a covering effect.

The present invention provides an optical connector, which has an integrally formed accommodation base. The purpose of the present invention is to avoid multiple assembly elements to form the accommodation base, and avoid to result in reducing the rigidity of the optical connector due to too many assembly elements.

In one embodiment of the present invention, the present invention provides a delatch mechanism, for releasing a latching status between a positioning structure of a connector body and a positioning hole of a receptacle, comprising: a supporting base, disposed on the connector body; a delatching unit, coupled to the supporting base and the connector body; further comprising: a rotating base; rotatably coupled to the supporting base; a pressing structure, disposed on the rotating base and leaned against the connector body; and a release lever, connected to the rotating base.

In one embodiment of the present invention, the present invention provides an optical connector, comprising: a connector body; a delatch mechanism, connected to the connector body, further comprising: a supporting base, disposed on the connector body; a delatching unit, coupled to the supporting base and the connector body; further comprising: a rotating base; rotatably coupled to the supporting base; a pressing structure, disposed on the rotating base and leaned against the connector body; and a release lever, connected to the rotating base.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIGS. 3A and 3B are respectively a three-dimensional schematic diagram from different viewing angles of an embodiment of the accommodation base, and a partial cross-sectional schematic diagram illustrating the combination of the cover and the accommodation base.

FIG. 4 is a three-dimensional schematic diagram of the polarity adjusting portion in the present invention.

FIGS. 5A to 5C are schematic diagrams of the polarity change of the optical connector in the present invention.

FIGS. 7A and 7B are schematic diagrams of an embodiment of operating the delatch mechanism in the present invention.

FIGS. 7C and 7D are schematic diagrams of another embodiment of operating the delatch mechanism in the present invention.

DETAILED DESCRIPTION OF THE PREFERRED EMBODIMENTS

Figure 1:
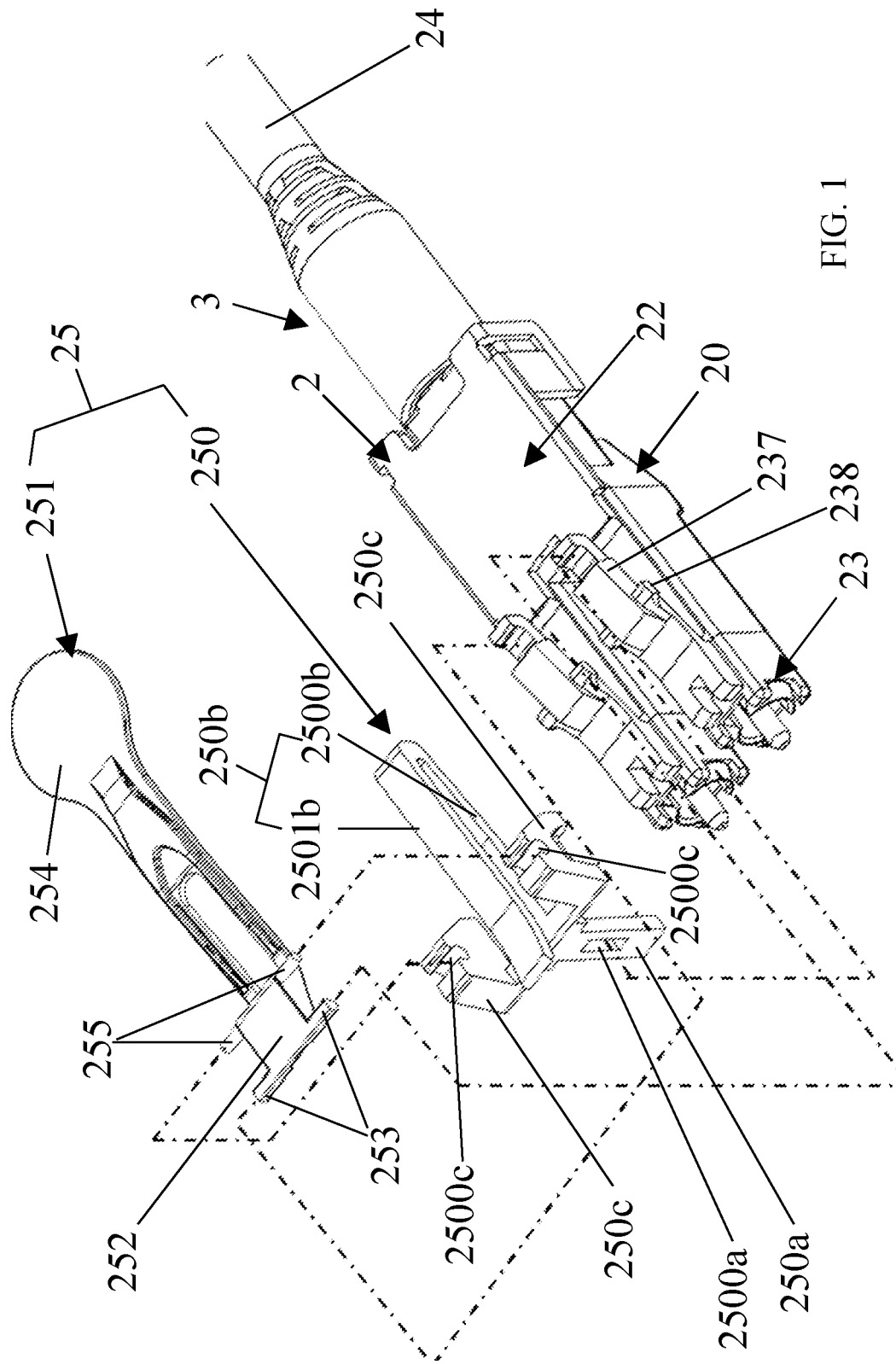
FIG. 1 is an exploded schematic diagram of the delatch mechanism of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a delatch mechanism and an optical connector using the same to aid it of skilled in the art in practicing this invention. These embodiments are merely exemplary embodiments and in no way to be considered to limit the scope of the invention in any manner.

Please refer to FIG. 1, which is an exploded schematic diagram of the delatch mechanism of the optical connector in the present invention. In this embodiment, the optical connector 3 has a connector body 2 and a delatch mechanism 25 disposed on the optical connector 3. The delatch mechanism 25 includes a supporting base 250 and a delatching unit 251. The supporting base 250 is disposed on the connector body 2 of the optical connector 3. The delatching unit 251 is coupled to the supporting base 250 and the connector body 2. The delatching unit 251 further has a rotating base 252, a pressing structure 253 and a release lever 254. The rotating base 252 is rotatably coupled to the supporting base 250. The pressing structure 253 is disposed on the rotating base 252 and is leaned against the connector body 2. In one embodiment, the pressing structure 253 applies pressure to the connector body 2 or releases pressure to the connector body 2 as the rotating base 252 rotates. The release lever 254 is connected with the rotating base 252.

Figure 2:
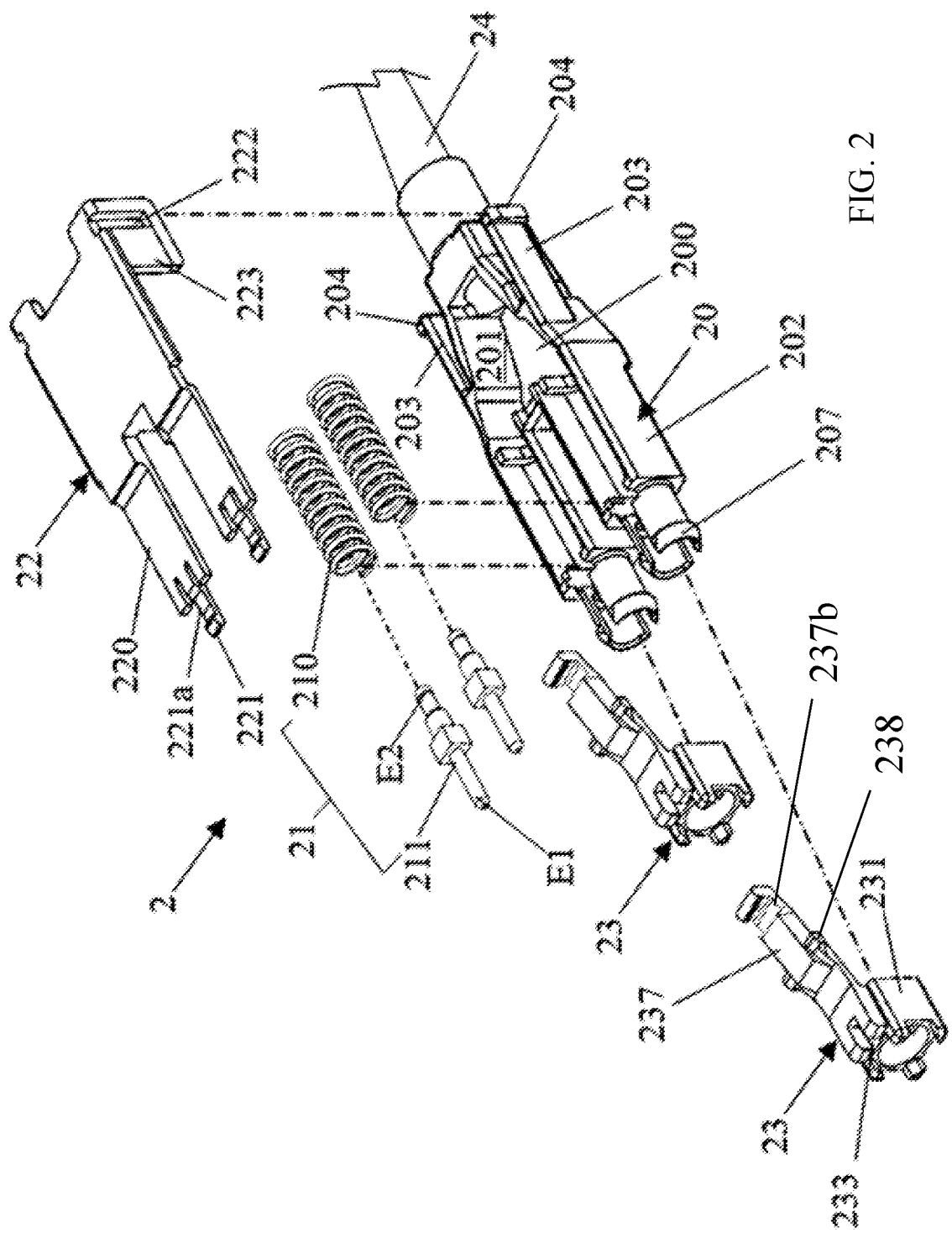
FIG. 2 is a three-dimensional exploded schematic diagram of an embodiment of the optical connector in the present invention.

Please refer to FIG. 2, which is a three-dimensional exploded schematic diagram of an embodiment of the optical connector in the present invention. In this embodiment, the connector body 2 includes an accommodation base 20, a terminal module 21, a cover 22 and a polarity adjusting portion 23. A side of the accommodation base 20 has an opening 200, an accommodation space 201 disposed into the accommodation base 20 is connected to the opening 200, and the accommodation base 20 has at least one terminal accommodation portion 202. In this embodiment, the terminal accommodation portions 202 are a pair and are arranged in parallel with each other. The terminal module 21 is arranged in the terminal accommodation portion 202. In this embodiment, the terminal module 21 further includes an elastic member 210 and a terminal member 211. The elastic member 210 is disposed in the terminal accommodation portion 202, and an end of the elastic member 210 is leaned against a wall surface of an end of the terminal accommodation portion 202. The terminal member 211 is disposed in the terminal accommodation portion 202, and one end portion E1 of the terminal member 211 protrudes from the terminal accommodation portion 202, and another end portion E2 of the terminal member 211 passes through the elastic member 210. An optical fiber cable 24 is connected to an end of the terminal accommodation portion 202. The terminal member 211 is used for coupling with the optical fiber in the optical fiber cable 24. In this embodiment, the accommodation base 20 is integrally formed by the housing of the accommodation space 201, the housing of the terminal accommodation portion 202, and the end base 207 at the front end of the terminal accommodation portion 202 to reduce the number of assembly elements and increases the rigidity of the entire accommodation base 20.

The cover 22 is disposed on the side of the opening 200 of the accommodation base 20 to seal the opening 200. The cover 22 has an extending cover 220 corresponding to each terminal accommodation portion 202, and a first buckle structure 221 is disposed on an end of the extending cover 220. In this embodiment, the first buckle structure 221 is extended from the supporting arm 221a protruding from an end of the extending cover 220. The supporting arm 221a may be deformed under an interaction force to change the position of the first buckle structure 221. When the interaction force is removed, the first buckle structure 221 can return to the initial position. In this embodiment, the cover 22, the extending cover 220 and the first buckle structure 221 are integrally formed to reduce the number of assembly elements and increase the rigidity of the entire cover 22. In addition, the extending arms 203 are respectively extended from both sides of the accommodation base 20, an end of the extending arm 203 has a first engaging structure 204 corresponding to a second engaging structure 222 on both sides of the cover 22. In this embodiment, a plate body 223 corresponding to the first engaging structure 204 is formed on both sides of the cover 22, and the second engaging structure 222 is formed on the plate body 223. When the cover 22 is disposed on the accommodation base 20, the first engaging structure 204 is engaged with the second engaging structure 222. In this embodiment, the first engaging structure 204 is a convex cylinder, and the second engaging structure 222 is a slot structure corresponding to the convex cylinder. In another embodiment, the second engaging structure 222 may be a convex cylinder, and the first engaging structure 204 may also be a slot structure corresponding to the convex cylinder. It should be noted that the aspect of the first engaging structure and the second engaging structure is not limited thereto, and those skilled in the art may appropriately change according to needs.

Please refer to FIGS. 3A and 3B, which are respectively a three-dimensional schematic diagram from different viewing angles of an embodiment of the accommodation base, and a partial cross-sectional schematic diagram illustrating the combination of the cover and the accommodation base. Through FIGS. 3A and 3B, the combination of the cover and the accommodation base, and the combination of supporting base and the optical connector are going to be explained. In this embodiment, a double locking mechanism is disposed between the cover 22 and the accommodation base 20 to prevent the cover 22 from falling off. The first engaging structure 204 and the second engaging structure 222 shown in FIG. 2 are the first locking mechanism between the cover 22 and the accommodation base 20. The second locking mechanism is to have a first assembly structure 205 in the accommodation base 20 and a second assembly structure 224 on the cover 22. In an embodiment, the cover 22 has a connecting wall 225 between the two extending cover 220 corresponding to the terminal accommodation portion 202, the connecting wall 225 protrudes toward the accommodation space 22, and a second assembly structure 224 is disposed on the connecting wall 225. When the cover 22 is disposed on the opening 200, the second assembly structure 224 is combined with the first assembly structure 205. In this embodiment, the first assembly structure 205 is disposed on the connecting structure 206 between the two terminal accommodation portions 202. In one embodiment, the first assembly structure 205 is a groove, and the second assembly structure 224 is a convex structure, and the second assembly structure 224 is embedded in the groove when the cover 22 is disposed on the opening 200 to generate a fixing effect. In another embodiment, the first assembly structure 205 may be a convex structure, and the second assembly structure 224 may also be a groove.

Next, an embodiment of combining the supporting base 250 and the optical connector 3 is going to be described. In this embodiment, referring to FIGS. 1 and 3B, the supporting base 250 includes a connecting portion 250a, a flexible member 250b, and a pair of shaft bases 250c. The connecting portion 250a is coupled to the optical connector 3. In this embodiment, the connecting portion 250a is connected to the connecting structure 206 between the two terminal accommodation portions 202 on the accommodation base 20. In one embodiment, the connecting portion 250a has a first connecting structure 2500a, and the connecting structure 206 has a second connecting structure 206a for connecting with the first connecting structure 2500a, so that the connecting portion 250a may be fixed to the accommodation base 20. In this embodiment, the first connecting structure 2500a is a through slot, and the second connecting structure 206a is a convex structure that can be matched with the through slot. It should be noted that the first connecting structure 2500a may be a convex structure, and the second connecting structure 206a may also be a through slot.

An end of the flexible member 250b is connected with the connecting portion 250a, and another end of the flexible member 250b is leaned against the rotating base 252. In this embodiment, the flexible member 250b further has a first rod 2500b and a second rod 2501b, wherein the first end of the first rod 2500b is connected to the connecting portion 250a, the second end of the first rod 2500b is connected to the second end of the second rod 2501b, and the first end of the second rod 2501b is leaned against the rotating base 252. Since the first rod 2500b is connected to an end of the second rod 2501b, but not connected to another end of the second rod 2501b, the first rod 2500b and another end of the second rod 2501b are separated by a certain distance, so that the flexible member 250b can generate elastic compression and accumulate elastic restoring force through the first rod 2500b and the second rod 2501b. The pair of shaft bases 250c are respectively arranged on both sides of the flexible member 250b and connected to the connecting portion 250a. In this embodiment, a pivot groove 2500c is disposed on the shaft base 250c. On both sides of the rotating base 252, pivot shafts 255 are pivotally connected to the corresponding pivot grooves 2500c on the rotating base 250c, respectively.

Please refer to FIGS. 1-2 and FIG. 4, the polarity adjusting portion 23 is rotatably sleeved on a periphery of the terminal accommodation portion 202. When the polarity adjusting portion 23 rotates to a position, the second buckle structure 230 on the polarity adjusting portion 23 is connected with the first buckle structure 221 for positioning the polarity adjusting portion 23. In this embodiment, the polarity adjusting portion 23 has a frame 231 with a through hole 232 for allowing the end base 207 of the terminal accommodation portion 202 to pass through, so that the first buckle structure 221 located on the end base 207 is buckled with the second buckle structure 230 to achieve the effect of fixing the polarity adjusting portion 23 on the terminal accommodation portion 202. In addition, in one embodiment, the second buckle structure 230 is formed on the surface 233 of the polarity adjusting portion 23, and a third buckle structure 235 corresponding to the second buckle structure 230 is formed on the another surface corresponding to the surface 233. When the first buckle structure 221 and the second buckle structure 230 are released and the polarity adjusting portion 23 is rotated by a predetermined angle, which is 180 degrees in this embodiment, the third buckle structure 235 rotates to a position corresponding to the first buckle structure 221 and buckles with the first buckle structure 221. In this embodiment, a pressing rod 237 is further formed on the surface 233 of the polarity adjusting portion 23, and the deformation of the supporting arm 221a can be controlled by the pressing rod 237, and the latching status between the first buckle structure 221 and the second buckle structure 230 or between the first buckle structure 221 and the third buckle structure 235 is also controlled. In this embodiment, an end of the pressing rod 237 has an opening slot 237b for accommodating a pressing structure 253. In this embodiment, the pressing structure 253 is two protruding rods, which are respectively arranged on both sides of the rotating base 252 and respectively leaned against the corresponding opening slots 237b.

Figure 5B:
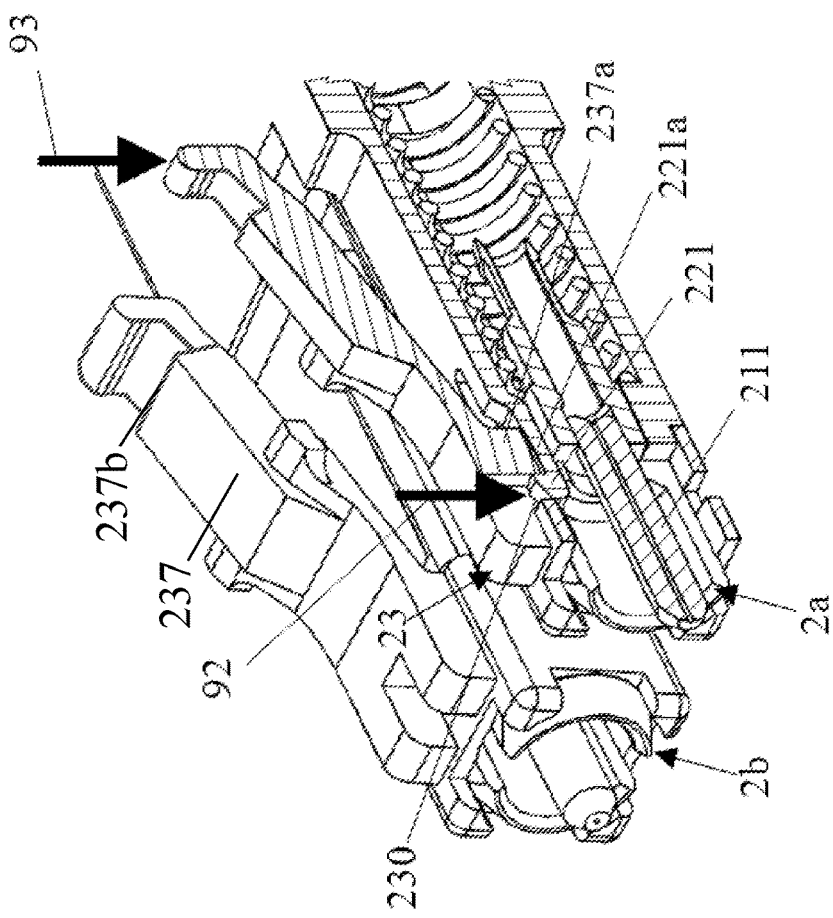
Figure 5C:
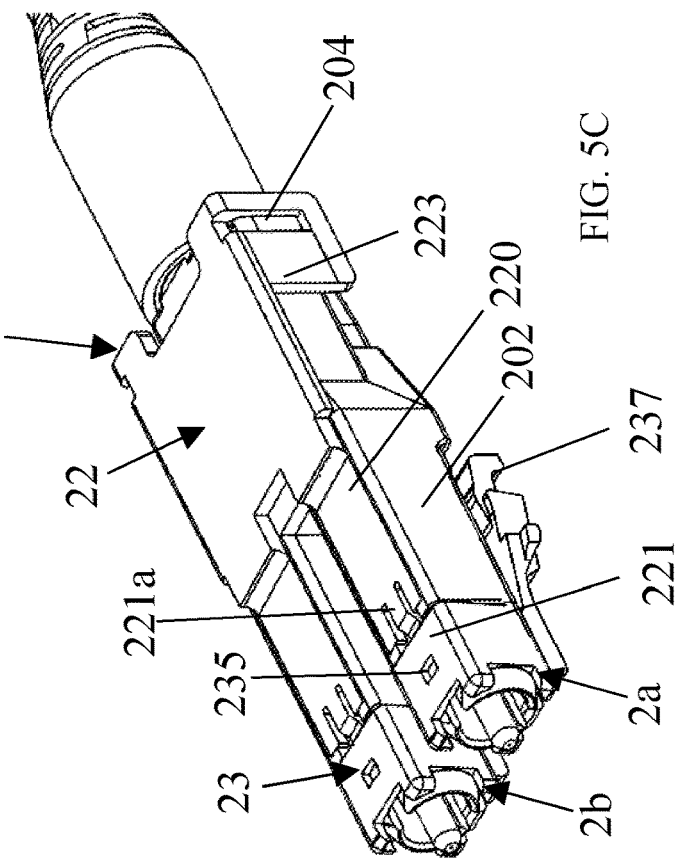

Please refer to FIGS. 5A to 5C, which are schematic diagrams of the polarity change of the optical connector in the present invention. It should be noted that when changing the polarity, the delatch mechanism 25 is disassembled from the connector body 2. In FIG. 5A, the connector body 2 has a pair of sub-connectors 2a and 2b. In the state of FIG. 5A, the polarity adjusting portion 23 is located at the first position, that is, the pressing rod 237 is located on such side of the cover 22. Please refer to FIG. 5B, which illustrates a schematic cross-sectional diagram of one of the sub-connectors 2a. In this embodiment, in the state of the connector body shown in FIG. 5A, taking the sub-connector 2a as an example, when the polarity adjusting portion 23 is located at the first position, the second buckle structure 230 is buckled with the first buckle structure 221. In this situation, there are two ways to change the polarity, which is to switch from the latching status between the second buckle structure 230 and the first buckle structure 221 to the latching status between the third buckle structure 235 and the first buckle structure 221. The first way to change the polarity is to apply an interaction force 92 to the first buckle structure 221 by a tool or a finger, so that the second buckle structure 230 is separated from the first buckle structure 221. After that, the polarity adjusting portion 23 may be rotated by a predetermined angle, which is 180 degrees in this embodiment, so that the third buckle structure 235 of the polarity adjusting portion 23 corresponds to the first buckle structure 221. When the interaction force 92 in FIG. 5B no longer acts on the first buckle structure 221, the supporting arm 221a brings the first buckle structure 221 back to the initial position, so that the third buckle structure 235 is buckled with the first buckle structure 221 to form the state shown in FIG. 5C, and the effect of changing the polarity is achieved.

The second way to change the polarity is to use the pressing rod 237 of the polarity adjusting portion 23. In this embodiment, through the interaction force 93 applied to the pressing rod 237, the pressing rod 237 drives the connecting body 237a to apply a force on the supporting arm 221a, so that the supporting arm 221a is deformed downward, and the second buckle structure 230 is separated from the first buckle structure 221. After that, the polarity adjusting portion 23 may be rotated by a predetermined angle, which is 180 degrees in this embodiment, so that the third buckle structure 235 of the polarity adjusting portion 23 corresponds to the first buckle structure 221. Since the interaction force 93 in FIG. 5B no longer acts on the first buckle structure 221, the supporting arm 221a brings the first buckle structure 221 back to the initial position, so that the third buckle structure 235 is buckled with the first buckle structure 221 to form a state as shown in FIG. 5C, and the effect of changing the polarity is achieved.

Figure 6:
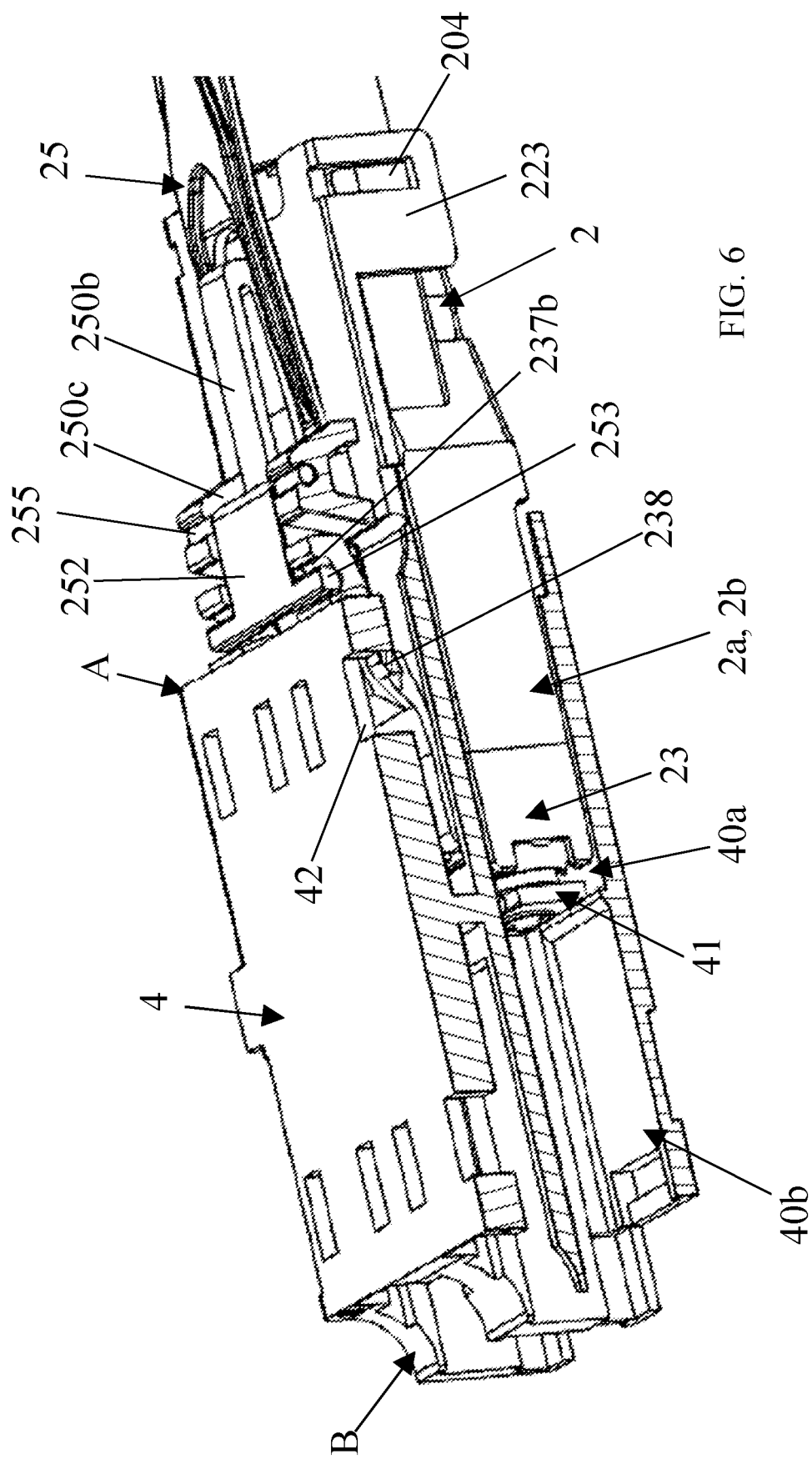
FIG. 6 is a partial schematic cross-sectional diagram illustrating the combination of the optical connector and the receptacle in the present invention.

Please refer to FIG. 6, which is a partial schematic cross-sectional diagram illustrating the combination of the optical connector and the receptacle in the present invention. In this embodiment, the receptacle 4 includes a first side A and a second side B. The first side A and the second side B have at least one insertion hole 40a and 40b, respectively. The insertion hole 40a of the first side A corresponds to the insertion hole 40b of the second side B. In this embodiment, the first side A and the second side B have two insertion holes 40a and 40b, respectively. In the receptacle 4, the insertion holes 40a and 40b corresponding with each other have a coupling structure 41 for coupling with a pair of sub-connectors 2a and 2b of the inserted connector body 2. The sub-connectors 2a and 2b are coupled to the optical connector (not shown) inserted from the insertion holes 40a and 40b. In this embodiment, positioning structures 238 are disposed on both sides of the pressing rod 237 to be combined with the positioning holes 42 on the receptacle 4 to generate the effect of positioning the connector body 2 in the receptacle 4.

When the connector body 2 is to be taken out from the receptacle 4, the connector body 2 can be pulled out of the receptacle 4 by operating the delatch mechanism 25. In one embodiment, as shown in FIGS. 6, 7A and 7B, the rotational movement 94 may be performed by the release lever 254. In this embodiment, it rotates counterclockwise to release the latching status between the positioning structure 238 and the positioning hole 42. As shown in FIG. 7A, the positioning structure 238 at this time is located in the positioning hole 42 to generate a latching effect. When the release lever 254 performs the rotational movement 94, the release lever 254 drives the rotating base 252 to rotate. At this time, the rotating base 252 would rotate counterclockwise with the pivot shaft 255 of the shaft base 250c as the rotation axis to form the state shown in FIG. 7B. Once the rotating base 252 rotates counterclockwise, the rotating base 252 and the pressing structure 253 synchronously presses the pressing rod 237, so that the pressing rod 237 rotates clockwise, and the positioning structure 238 on the pressing rod 237 is separated from the positioning hole 42 and the latching status is released. At this time, the optical connector can be immediately pulled out of the receptacle.

It should be noted that while the pressing structure 253 presses the pressing rod 237, the rotating base 252 is synchronously pressed against the flexible member 250b, so that the flexible member 250b is deformed and the elastic restoring force is accumulated. Therefore, after the optical connector is pulled out of the receptacle, once the rotational movement 94 applied to the release lever 254 disappears, the elastic restoring force accumulated by the flexible member 250b can be released. The released elastic restoring force acts on the rotating base 252, so that the rotating base 252 rotates clockwise with the pivot shaft 255 of the shaft base 250c as the rotation axis. When the rotating base 252 rotates clockwise, the pressing rod 237 returns to the initial position counterclockwise shown in FIG. 7A because it is no longer pressed by the pressing structure 253.

In another embodiment, in addition to the rotation way of FIG. 7A, it is also possible to pull the release lever 254 through a linear movement 95 as shown in FIG. 7C to release the latching status. Since there is a distance D between the pivot shaft 255 and the release lever 254, when the release lever 254 is pulled in the direction of linear movement 95, the pivot shaft 255 would be used as the rotation axis and the distance D would be used as the arm to produce a torque effect in counterclockwise, so that the rotating base 252 rotates counterclockwise to form the state shown in FIG. 7D. Once the rotating base 252 rotates counterclockwise, the rotating base 252 and the pressing structure 253 synchronously presses the pressing rod 237, so that the pressing rod 237 rotates clockwise, and the positioning structure 238 on the pressing rod 237 is separated from the positioning hole 42 and the latching status is released. At this time, the optical connector may be immediately pulled out of the receptacle.

It should be noted that while the pressing structure 253 presses the pressing rod 237, the rotating base 252 is synchronously pressed against the flexible member 250b, so that the flexible member 250b is deformed and the elastic restoring force is accumulated. Therefore, after the optical connector is pulled out of the receptacle, once the rotational movement 95 applied to the release lever 254 disappears, the elastic restoring force accumulated by the flexible member 250b can be released. The released elastic restoring force acts on the rotating base 252, so that the rotating base 252 rotates clockwise with the pivot shaft 255 of the shaft base 250c as the rotation axis. When the rotating base 252 rotates clockwise, the pressing rod 237 is no longer pressed by the pressing structure 253 and returns to the initial position counterclockwise shown in FIG. 7C. At this time, the release lever 254 also moves to the initial position due to the rotating base 252 rotates back to the original position.

From the above description of the operation, the present invention provides a delatch mechanism which allows the user to choose the linear or rotating double delatching ways according to the situation, which improves the flexibility of operation. In addition, the present invention also releases the latching status between the optical connector and the receptacle by the delatch mechanism with flexible restoring force. In addition, the delatch mechanism also generates the restoring force to return the buckle structure of the optical connector to the original position, ensuring that the buckle structure of the connector can return to the original position.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A delatch mechanism, for releasing a latching status between a positioning structure of a connector body and a positioning hole of a receptacle, comprising:
a supporting base, disposed on the connector body;
a delatching unit, coupled to the supporting base and the connector body; comprising:
a rotating base; rotatably coupled between the supporting base and the connector body;
a pressing structure, disposed on the rotating base, and leaned against the connector body; and
a release lever, connected to the rotating base,
wherein the supporting base comprises:
a connecting portion, coupled to the connector body;
a flexible member, being a flexible structure, an end of the flexible member connected to the connecting portion and another end of the flexible member leaned against the rotating base; and
a pair of shaft bases, respectively disposed on two sides of the flexible member and connected to the connecting portion.

2. The delatch mechanism of claim 1, wherein a pivot shaft is protruded from two sides of the rotating base to pivotally connected to the pair of shaft bases.

3. The delatch mechanism of claim 1, wherein the flexible member comprises a first rod and a second rod, a first end of the first rod is connected to the connecting portion, a second end of the first rod is connected to a second end of the second rod, and a first end of the second rod is leaned against the rotating base.

4. The delatch mechanism of claim 1, wherein the pressing structure is two protruding rods, which are respectively arranged on two sides of the rotating base and leaned against the optical connector.

5. An optical connector, comprising:
a connector body;
a delatch mechanism, connected to the connector body, comprising:
a supporting base, disposed on the connector body;
a delatching unit, coupled to the supporting base and the connector body; comprising:
a rotating base; rotatably coupled between the supporting base and the connector body;
a pressing structure, disposed on the rotating base, and leaned against the connector body; and
a release lever, connected to the rotating base,
wherein the supporting base comprises:
a connecting portion, coupled to the connector body;
a flexible member, being a flexible structure, an end of the flexible member connected to the connecting portion and another end of the flexible member leaned against the rotating base; and
a pair of shaft bases, respectively disposed on two sides of the flexible member and connected to the connecting portion.

6. The optical connector of claim 5, wherein the connector body comprises:
an accommodation base, an opening disposed on a side of the accommodation base, which has an accommodation space connected to the opening and has at least one terminal accommodation portion;
a terminal module, disposed in the terminal accommodation portion;
a cover, disposed on the opening of the accommodation base to seal the opening, the cover having extending covers corresponding to the each terminal accommodation portion, an end of the extending cover having a first buckle structure; and
a polarity adjusting portion, rotatably sleeved on a periphery of the terminal accommodation portion,
wherein when the polarity adjusting portion rotates to a predetermined position, a second buckle structure disposed on the polarity adjusting portion is connected with the first buckle structure for positioning the polarity adjusting portion.

7. The optical connector of claim 6, wherein the terminal module comprises:
an elastic member, disposed in the terminal accommodation portion, an end of the elastic member leaned against a wall surface of an end of the terminal accommodation portion; and
a terminal member, disposed in the terminal accommodation portion, an end portion of the terminal member protruded from the terminal accommodation portion, and another end portion of the terminal member penetrated into the elastic member.

8. The optical connector of claim 6, wherein the accommodation base has a first assembly structure, and the cover has a second assembly structure; when the cover is disposed on the opening, the second assembly structure is combined with the first assembly structure.

9. The optical connector of claim 8, wherein the terminal accommodation portions are a pair and are arranged in parallel with each other, a connecting structure is disposed between the terminal accommodation portions, and the first assembly structure is disposed on the connecting structure.

10. The optical connector of claim 9, wherein the cover has the second assembly structure, which is disposed between the extending cover corresponding to the terminal accommodation portion and protrudes toward the accommodation space.

11. The optical connector of claim 6, wherein two sides of the accommodation base respectively have a first engaging structure, and two sides of the cover have a second engaging structure; when the cover is set on the accommodation base, the first engaging structure is engaged with the second engaging structure.

12. The optical connector of claim 6, wherein the polarity adjusting portion comprises a third buckle structure; when the first buckle structure and the second buckle structure are released and the polarity adjusting portion is rotated by a predetermined angle, the third buckle structure buckles with the first buckle structure.

13. The optical connector of claim 6, wherein a pressing rod is extended from the polarity adjusting portion.

14. The optical connector of claim 13, wherein two sides of the pressing rod have a positioning structure.

15. The optical connector of claim 13, wherein an end of the pressing rod has an opening slot corresponding to the pressing structure.

16. The optical connector of claim 6, wherein the extending cover is connected to the first buckle structure by a supporting arm.

17. The optical connector of claim 5, wherein a pivot shaft is protruded from two sides of the rotating base to pivotally connected to the pair of shaft bases.

18. The optical connector of claim 5, wherein the flexible member comprises a first rod and a second rod, a first end of the first rod is connected to the connecting portion, a second end of the first rod is connected to a second end of the second rod, and a first end of the second rod is leaned against the rotating base.

19. The optical connector of claim 6, wherein the pressing structure is two protruding rods, which are respectively arranged on two sides of the rotating base and leaned against the optical connector.

* * * * *